(12) United States Patent
Wu et al.

(10) Patent No.: US 8,189,950 B2
(45) Date of Patent: May 29, 2012

(54) IMAGE ENHANCEMENT METHOD USING LOCAL GAIN CORRECTION

(75) Inventors: Ming-Yang Wu, Chieh Lung (TW); Chi-Chang Yu, Chieh Lung (TW); Brian Sung, Taipei (TW)

(73) Assignee: Avisonic Technology Corp., Hsin-Chu (TW)

( * ) Notice: Subject to any disclaimer, the term of this patent is extended or adjusted under 35 U.S.C. 154(b) by 681 days.

(21) Appl. No.: 12/425,036

(22) Filed: Apr. 16, 2009

(65) Prior Publication Data

US 2010/0067819 A1 Mar. 18, 2010

(30) Foreign Application Priority Data

Sep. 12, 2008 (TW) ................................ 97134971 A

(51) Int. Cl.
*G06K 9/40* (2006.01)
(52) U.S. Cl. .................................. 382/274; 382/167
(58) Field of Classification Search .................. 382/162, 382/167, 168, 169, 260, 274
See application file for complete search history.

(56) References Cited

U.S. PATENT DOCUMENTS 5,724,456 A * 3/1998 Boyack et al. ................ 382/274
7,639,893 B2 * 12/2009 Duan et al. .................... 382/274

OTHER PUBLICATIONS

Hau Ngo, et al.,"Design of an Efficient Architecture for Real-time Image Enhancement Based on a Luma-Dependent Nonlinear Approach", ITCC 2004. International Conference on Publication, Apr. 2004, vol. 1, pp. 656-660.
Sangkeun Lee, et al., "Dynamic Range Compression and Contrast Enhancement for Digital Images in the Compressed Domain", Optical Engineering, Publication Date: Feb. 2006, vol. 45, pp. 1-14.

* cited by examiner

*Primary Examiner* — Phuoc Tran
(74) *Attorney, Agent, or Firm* — Muncy, Geissler, Olds & Lowe, PLLC

(57) ABSTRACT

The present invention relates to a method for image enhancement. The method includes the steps of: replacing a value of a pixel of a digital image with a maximum one of values of red, green and blue sub-pixels of the pixel; selecting a specific pixel from pixels of the digital image; selecting some of the pixels surrounding the specific pixel to constitute a specific block; calculating an average of values of the pixels of the specific block; providing multiple curve functions; obtaining a corresponding one of the curve functions according to the average, and substituting the value of the pixel of the image into the curve functions to obtain new output brightness values.

20 Claims, 14 Drawing Sheets

IMAGE ENHANCEMENT METHOD USING LOCAL GAIN CORRECTION

This application claims priority of No. 097134971 filed in Taiwan R.O.C. on Sep. 12, 2008 under 35 USC 119, the entire content of which is hereby incorporated by reference.

BACKGROUND OF THE INVENTION

1. Field of Invention

The present invention relates to the image processing technology, and more particularly to an image enhancement method using the local gain correction.

2. Related Art

Recently, the progress of the technology makes the types of multimedia become more and more diversified. As for the digital video, such as a digital photo, a digital display, a digital film or the digital video broadcasting technology, the image enhancement technology is greatly emphasized. The image processing is to make various changes of the image frames on the color, the brightness, the focal length and the like of the obtained digital image according to the functions provided by the image processing operation technology, or even to synthesize two photos through the more complicated operation procedures. For example, it is possible to quickly transform a sunshiny photo into a rainy photo according to some functions of image processing (e.g., the functions of changing of the brightness and the contrast). Alternatively, it is possible to stealthily substitute one thing for another according to two photos by way of the image processing procedures of selecting, cutting and pasting. Thus, the original look of the image may be changed. Therefore, the image processing is to change or analyze the data on the image.

As for the image processing, which needs to distinguish between the brightness of different images, the brightness distribution of the image is often used for the analysis. FIG. 1 is a Flow chart showing a conventional digital image enhancement method. Referring to FIG. 1, the operation includes the following steps in order to enhance the contrast of the image.

In step S101, the method starts.

In step S102, an input frame is acquired.

In step S103, a brightness histogram of the input frame is detected.

In step S104, a curve function is obtained according to the brightness histogram.

In step S105, the pixels of the input frame are substituted into the curve function to achieve the effect of enhancing the contrast ratio or the dynamic range of the image.

In step S106, the method ends.

FIG. 2A is a brightness histogram showing pixels of a photo with the larger brightness difference. FIG. 2B is a brightness histogram showing blue pixels of a photo with the larger brightness difference. As shown in FIGS. 2A and 2B, the brightness average of the photo is lower. In addition, as shown in FIG. 2B, the blue pixels of this photo have the extreme distribution. That is, the blue pixels of this photo have the extremely great brightness difference. When the brightness difference of one digital image is extremely great, the details of the processed photo image may disappear if only the digital image enhancement method of FIG. 1 is used.

In addition, in order to solve the above-mentioned problems, methods of enhancing the image using algorithms have been proposed. For example, the methods disclosed in [1] and [2] have to transform the image from the spatial domain to the frequency domain by way of, for example, Fast Fourier Transform (FFT) or Discrete Cosine Transform (DCT). Although the method can obtain the image with the better dynamic range, the operation needs the greater calculation load. If the method is implemented in the product, the layout area of the integrated circuit is inevitably increased. In addition, the power consumption is also increased with the increase of the calculation load.

[1] Lee, Sangkeun; Ha, Hyeong-Seok V.; Kim, Yeong-Hwa "Dynamic range compression and contrast enhancement for digital images in the compressed domain" Optical Engineering, Publication Date: February 2006, On page(s): 1-14 Vol. 45.

[2] Hau Ngo; Li Tao; Vijayan Asari "Design of an Efficient Architecture for Real-time Image Enhancement Based on a Luma-Dependent Nonlinear Approach" ITCC 2004. International Conference on Publication Date: April 2004, On page(s): 656-660 Vol. 1.

SUMMARY OF THE INVENTION

It is therefore an objective of the present invention to provide an image enhancement method for enhancing an image using the local gain correction.

Another objective of the present invention is to provide an image enhancement method for adaptively enhancing an image so that the enhanced image is still clear even if the brightness difference of the image is extremely great.

Still another objective of the present invention is to provide an image enhancement method for adaptively enhancing an image with the reduced calculation load.

To achieve the above-identified or other objectives, the present invention provides an image enhancement method. The method includes the steps of: replacing a value of a pixel of a digital image with luminance (combination of R, G, and B pixels) of the pixel; selecting a specific pixel from the pixels of the digital image; selecting some of the pixels surrounding the specific pixel to constitute a specific block; calculating an average of values of the pixels of the specific block; providing multiple curve functions; obtaining a corresponding one of the curve functions according to the average of the specific block, and substituting the values of the R, G, and B pixels of the image into the curve functions to obtain new output R, G, and B values.

In the image enhancement method according to the preferred embodiment of the present invention, the step of providing the curve functions includes providing a plurality of curve look-up-tables to represent the curve functions. In one embodiment, the method further includes the step of substituting a pixel value of the specific pixel into the specific curve function to obtain a corrected pixel value. In one embodiment, the method further includes the steps of: providing a curve index image; and recording a curve index of the specific curve function in the curve index image, wherein positions of pixels of the curve index image are the same as positions of the pixels of the digital image, and the curve index of the specific curve function is recorded at a corresponding position corresponding to the specific pixel. In one embodiment, the method further includes the step of eliminating the specific pixel, wherein the above-mentioned steps are repeated until all of the pixels have been extracted to fill the positions of the pixels of the curve index image. In one embodiment, the method further includes the step of substituting each of the pixels of the digital image into a corresponding one of the curve functions according to the curve index stored in the curve index image to obtain a corrected digital image.

In the image enhancement method according to the preferred embodiment of the present invention, the digital image includes M×N pixels, and the curve index image includes corresponding M×N pixels, and the step of substituting each of the pixels of the digital image into the corresponding one of the curve functions according to the curve index stored in the curve index image to obtain the corrected digital image includes the sub-steps of: (a) finding the corresponding curve function from the $(i, j)^{th}$ curve index of the curve index image; (b) substituting the $(i, j)^{th}$ pixel of the digital image into the curve function corresponding to the $(i, j)^{th}$ curve index of the curve index image to obtain the $(i, j)^{th}$ pixel of the corrected digital image; and (c) eliminating the extracted pixel, wherein the sub-steps (a) to (c) are repeated until all the pixels have been extracted, wherein M, N, i and j are natural numbers, $0<=i<=M-1$, and $0<=j<=N-1$.

The present invention further provides an image enhancement method. The method includes the steps of: replacing a value of a pixel of a digital image with luminance (combination of R, G, and B pixels) of the pixel; dividing the pixels of the digital image into multiple specific blocks; calculating an average of values of the pixels of the specific block; providing multiple curve functions; obtaining a corresponding one of the curve functions according to the average of the specific block, and substituting the value of the R, G, and B pixels of the image into the curve functions to obtain new output R, G, and B values.

In the image enhancement method according to the preferred embodiment of the present invention, the step of providing the curve functions includes providing a plurality of curve look-up-tables to represent the curve functions. In one embodiment, the method further includes the step of: obtaining the corresponding curve function according to the average of the specific block and substituting the value of the pixel into the curve functions to obtain new output brightness values. In one embodiment, the method further includes the step of recording a curve index of the specific curve function in the curve index image, wherein positions of the pixels of the curve index image are the same as positions of the blocks of the digital image. In one embodiment, the method further includes eliminating the specific block, wherein the above-mentioned steps are repeated until all of the blocks have been extracted to fill the positions of the pixels of the curve index image. In one embodiment, the method further includes the step of substituting each of the pixels of the digital image into a corresponding one of the curve functions according to the curve index stored in the curve index image to obtain a corrected digital image.

In the image enhancement method according to the preferred embodiment of the present invention, the digital image includes M×N blocks, and the curve index image includes corresponding M×N pixels. The step of substituting each of the pixels of the digital image into the corresponding one of the curve functions according to the curve index stored in the curve index image to obtain the corrected digital image includes the sub-steps of: (a) upscaling the curve index image to obtain a corrected curve index image, wherein the number of pixels of the corrected curve index image is the same as the number of pixels of the digital image; (b) finding a corresponding one of the curve functions from the $(i, j)^{th}$ curve index of the corrected curve index image; (c) substituting the $(i, j)^{th}$ pixel of the digital image into the curve function corresponding to the $(i, j)^{th}$ curve index of the corrected curve index image to obtain the $(i, j)^{th}$ pixel of the corrected digital image; and (d) eliminating the extracted pixel, wherein the sub-steps (b) to (d) are repeated until all the pixels have been extracted, wherein M, N, i and j are natural numbers, $0<=i<=M-1$, and $0<=j<=N-1$.

The spirit of the present invention is to find out the preferred curve function corresponding to the corrected unit in a manner of analyzing the brightness of the block brightness. Thus, even if the image has the extremely great brightness difference, the enhanced image still may be clear. In addition, the present invention has the following advantages. First, only the simple calculation is needed because the simple operations of addition, subtraction, multiplication and division are needed. Second, the smaller memory is needed because it is unnecessary to store reference images in advance.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 6 is a schematic illustration corresponding to the step S310 according to the embodiment of the present invention.

FIG. 7A shows the processing using the image enhancement method of FIG. 3 according to the embodiment of the present invention, wherein the upper portion corresponds to input image values, and the lower portion corresponds to output image results.

DETAILED DESCRIPTION OF THE INVENTION

The present invention will be apparent from the following detailed description, which proceeds with reference to the accompanying drawings, wherein the same references relate to the same elements.

Figure 3:
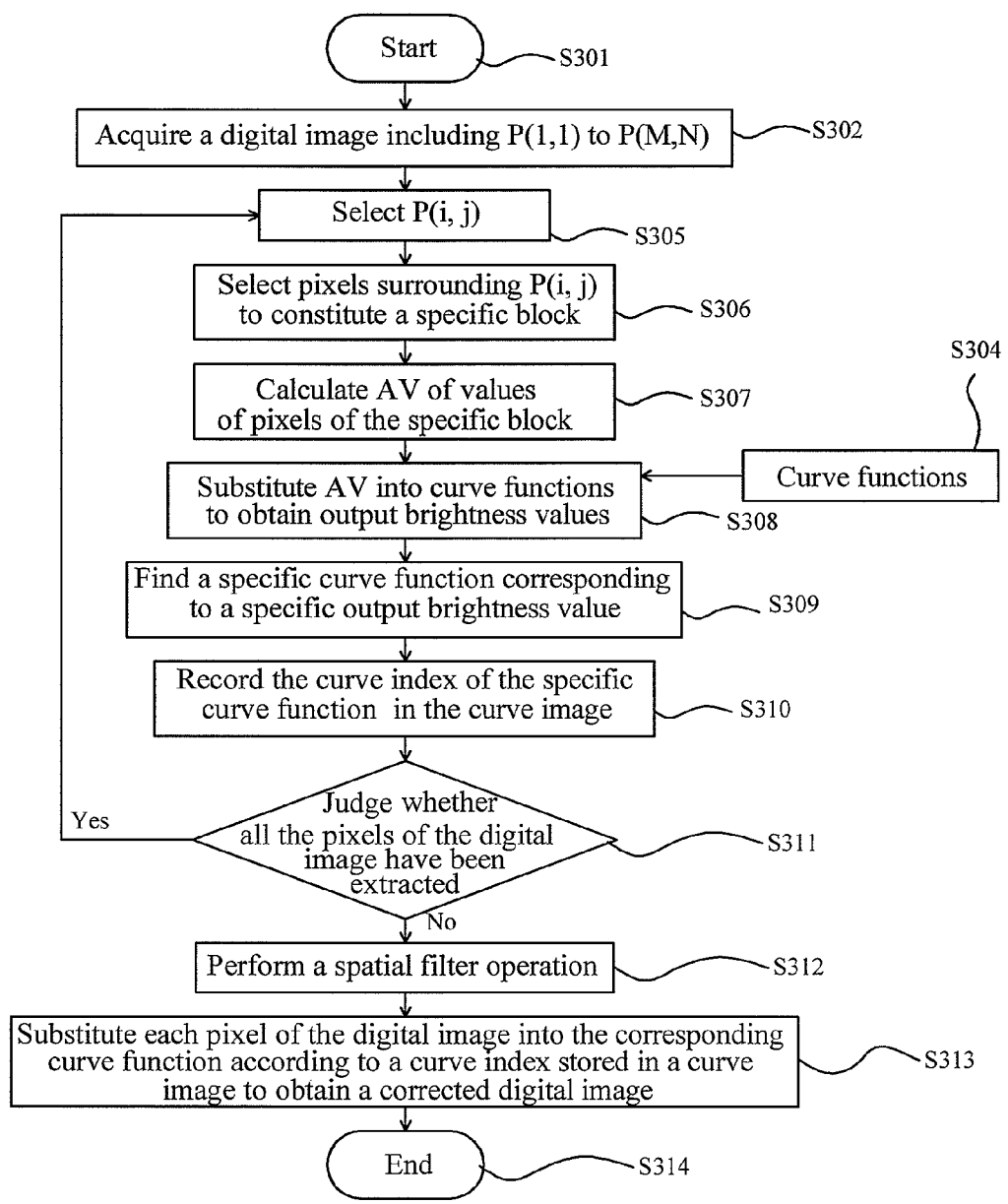
FIG. 3 is a flow chart showing an image enhancement method according to an embodiment of the present invention.

FIG. 3 is a flow chart showing an image enhancement method according to an embodiment of the present invention. Referring to FIG. 3, each pixel serves as a unit to perform the adaptive brightness correction on the pixels in this embodiment so that the dynamic range of the image can be increased. The image enhancement method includes the following steps.

In step S301, the method starts.

In step S302, a digital image is acquired, wherein the digital image has many pixels P(1, 1) to P(M, N), wherein M and N are respectively the total number of horizontal pixels and the total number of vertical pixels. In this embodiment, each pixel has three sub-pixels, which are respectively red R, green G and blue B sub-pixels. In order to enhance the effect using the method of this embodiment of the present invention applied to the image processing, the luminance (combination of R, G, and B pixels) of the pixel represents the pixel value of each pixel.

Figure 4:
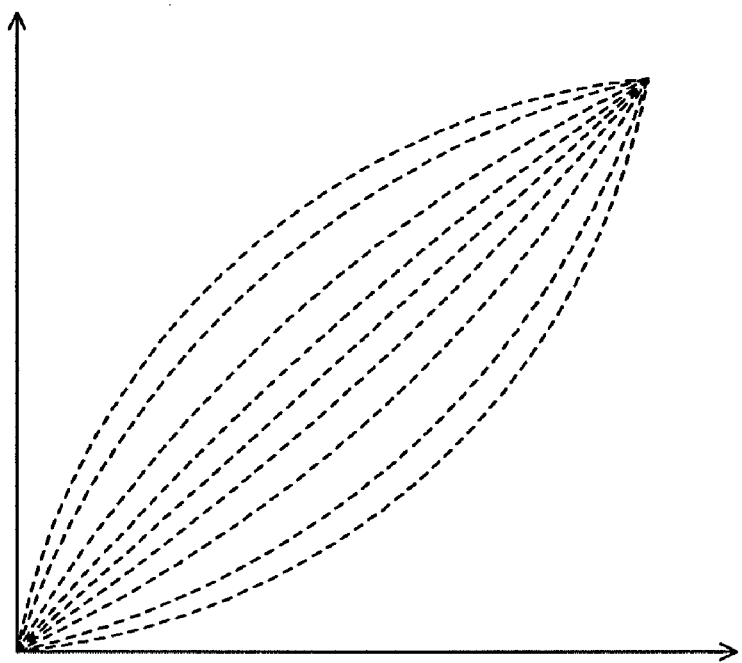
FIG. 4 is a schematic illustration showing curve functions in the step 304 according to the embodiment of the present invention.

In step S304, multiple curve functions are provided. FIG. 4 is a schematic illustration showing the curve functions in the step 304 according to the embodiment of the present invention. As shown in FIG. 4, generally speaking, the curve function is a one-to-one function, wherein y=f(x, γ) is an example of the curve function. In this embodiment, y is the output pixel value, x is the input pixel and γ is the curve index.

In step S305, a specific pixel P(i, j) is selected from the pixels of the digital image, wherein P(i, j) represents the pixel located at the $i^{th}$ column and the $j^{th}$ row.

Figure 5:
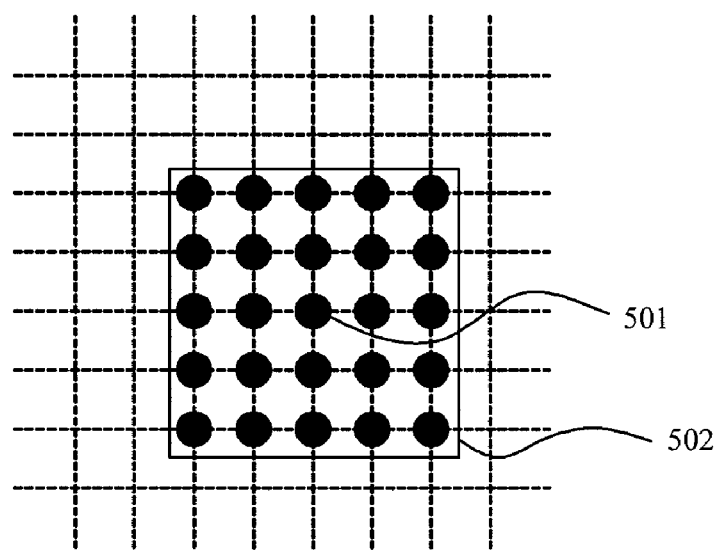
FIG. 5 is a schematic illustration corresponding to the steps S305 and S306 according to the embodiment of the present invention.

In step S306, multiple pixels surrounding the specific pixel are selected to constitute a specific block. FIG. 5 is a schematic illustration corresponding to the steps S305 and S306 according to the embodiment of the present invention. As shown in FIG. 5, it is assumed that the specific pixel being extracted in the step S305 is the pixel 501. In this case, multiple pixels, such as 502, surrounding the pixel 501 and distant from the pixel 501 by a fixed range are extracted in the step S306. Although the range of 5×5 is illustrated in the schematic illustration, one of ordinary skill in the art may easily understand that the range may be determined according to the software-hardware design, and is not restricted to have the square shape. So, the present invention is not limited thereto.

In step S307, an average AV of values of the pixels of the specific block is calculated. The sum of the pixel values of the pixels of the block is divided by the number of pixels to obtain the average of the block. In this embodiment, the luminance (combination of R, G, and B pixels) of the pixel serves as the pixel value.

In step S308, multiple output brightness values are obtained by substituting the average AV of the specific block into the curve functions.

In step S309, a specific output brightness value closest to a specific brightness value is found from the output brightness values so that a specific curve function corresponding to the specific output brightness value is found. Herein, it is possible to set the brightness value, which may be comfortably felt by the human eyes, as the specific brightness value. Next, the brightness values obtained in the step S308 are respectively compared with the specific brightness value so that the output brightness value closest to the specific brightness value can be found. Then, the corresponding curve function can be found according to the output brightness value closest to the specific brightness value. Because the pixels surrounding the specific pixel P(i, j) usually closely relate to the specific pixel P(i, j), the found curve function may be regarded as the preferred curve function corresponding to the specific pixel P(i, j).

Figure 6:
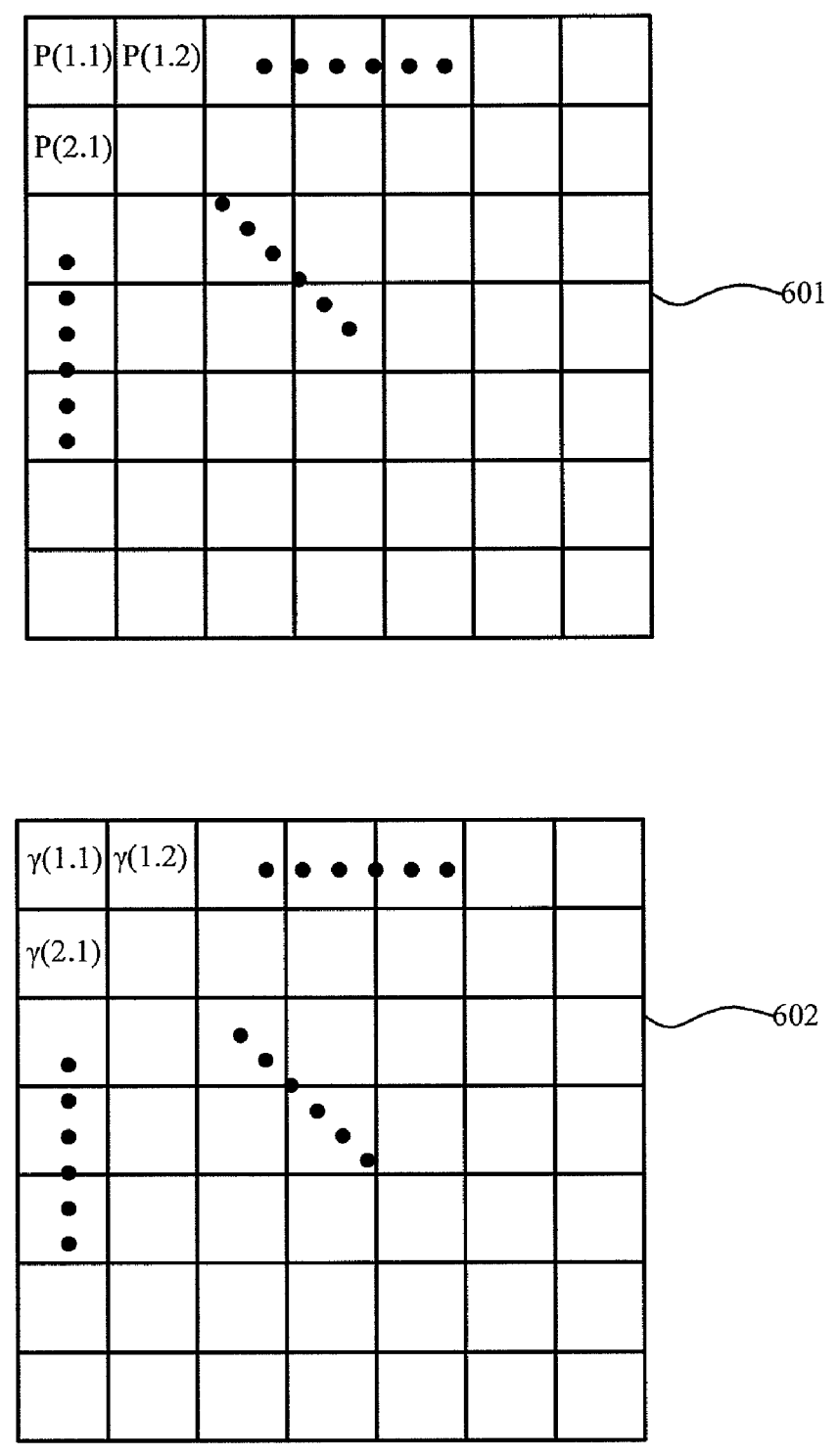

In step S310, the curve index of the specific curve function is recorded in the curve image, wherein the curve index of the specific curve function is recorded at the position corresponding to the specific pixel. FIG. 6 is a schematic illustration corresponding to the step S310 according to the embodiment of the present invention. Referring to FIG. 6, symbol 601 represents the digital image, and symbol 602 represents the curve index image in this embodiment. The pixel γ(i, j) of each curve index image stores the preferred curve index corresponding to the pixel P(i, j).

In step S311, it is judged whether there is a pixel, which has not been extracted. If the judgement is yes, the extracted pixel, such as the specific pixel P(i, j), is eliminated. The steps S302 to S310 are repeated until all the pixels P(1, 1) to P(M, N) have been extracted to fill the positions of the pixels of the curve index image. If all the pixels have been extracted, step S312 is performed.

In the step S312, a spatial filter operation is performed on the curve index image. If the curve index image is directly used to compensate the digital image, the textures of the image may disappear. Thus, the spatial Filter operation has to be performed on the curve index image. Generally speaking, the spatial operation is a low-pass operation. In the technological field of image processing, the spatial filter operation may be performed in many ways, and detailed description thereof will be omitted.

Figure 7A:
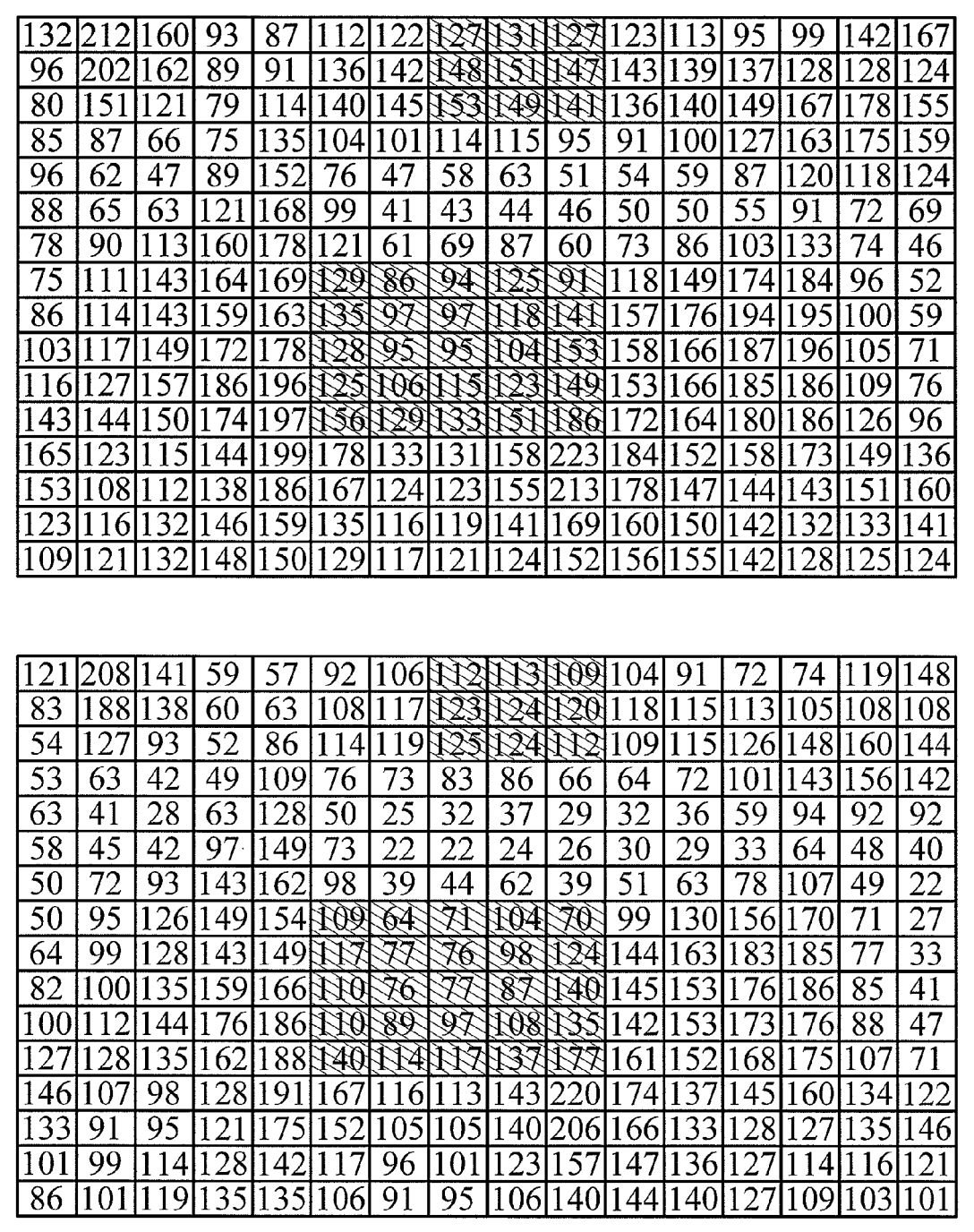

In step S313, each pixel of the digital image is substituted into the corresponding curve function according to the curve index stored in the curve index image to obtain a corrected digital image. FIG. 7A is a schematic illustration showing the image brightness values with the resolution of 16*16. As shown in FIG. 7A, the upper half portion corresponds to the values before being processed, while the lower half portion corresponds to the values after being processed. One of ordinary skill in the art may clearly see that the pixel values of the pixels P(0,7) and (0,9) before the image processing are equal to 127, but the values of thereof after the image processing according to the embodiment of the present invention are respectively equal to 112 and 109. This phenomenon represents that the image processing algorithm used in this embodiment of the invention can adaptively calculate different output results according to different brightness distributions in the neighboring region of the pixel.

Figure 1:
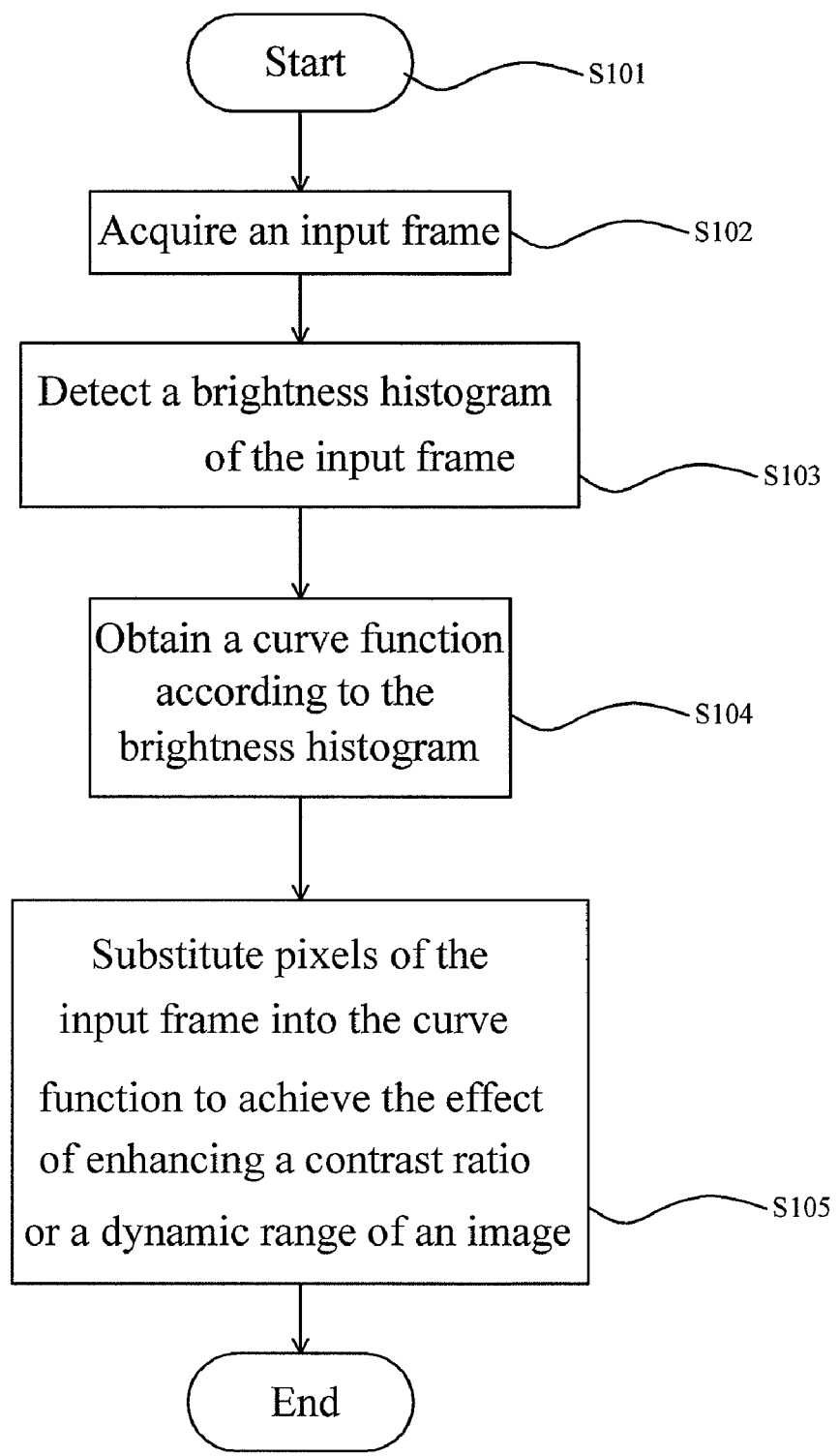
FIG. 1 is a flow chart showing a conventional digital image enhancement method.
Figure 2A:
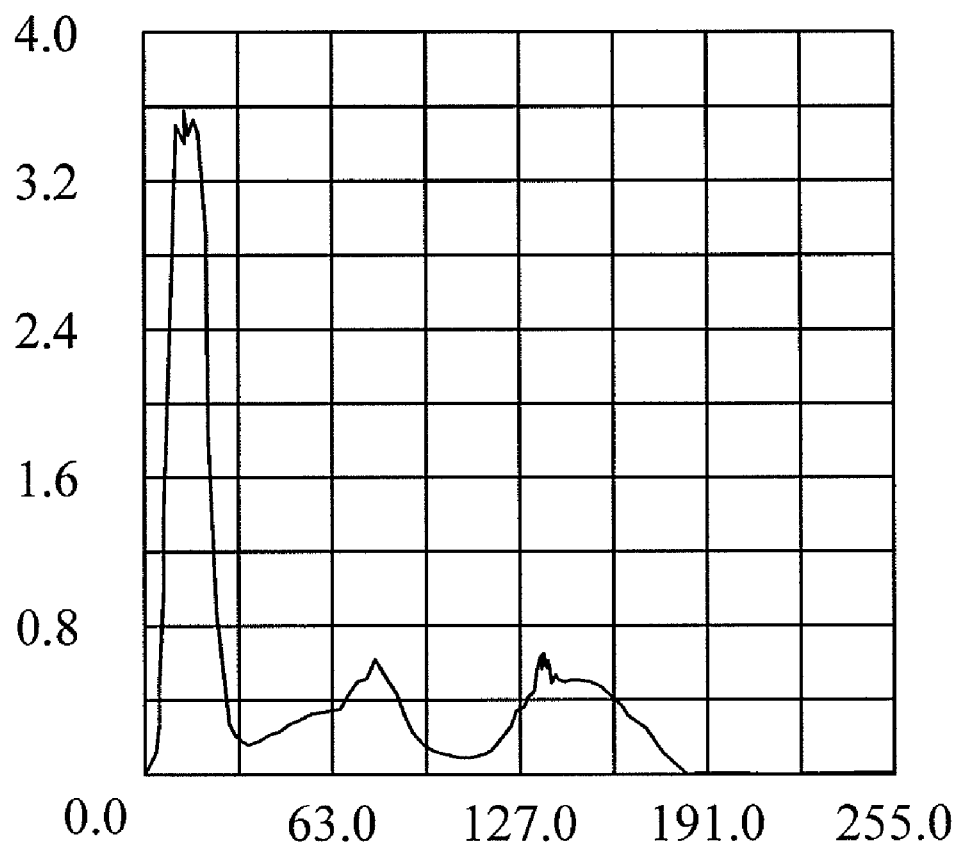
FIG. 2A is a histogram showing pixels of a photo with the larger brightness difference.
Figure 2B:
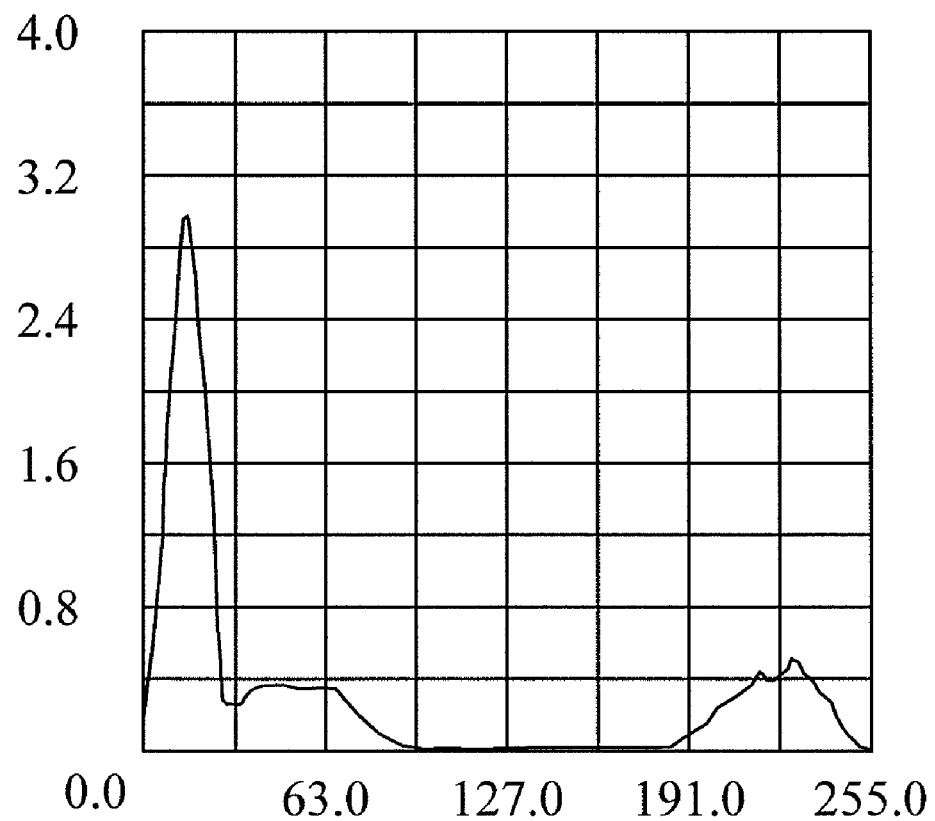
FIG. 2B is a brightness histogram showing blue pixels of a photo with the larger brightness difference.
Figure 7B:
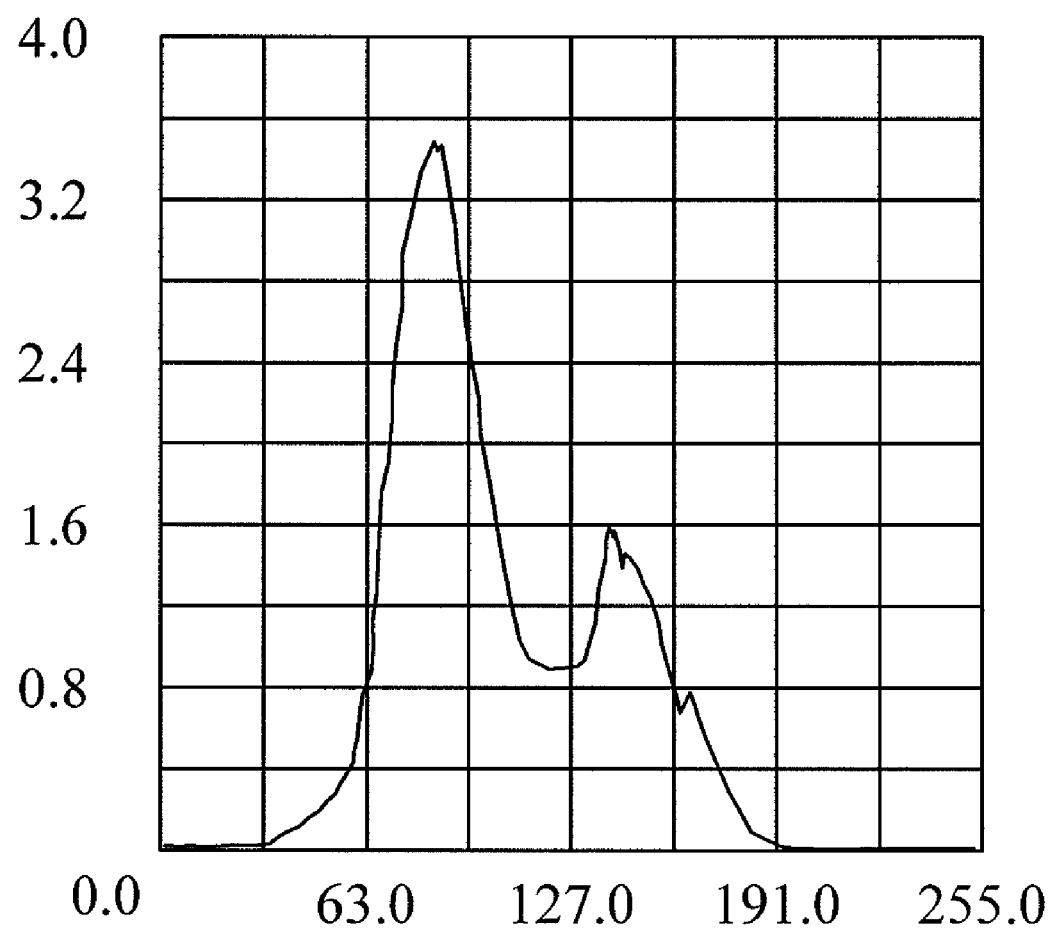
FIG. 7B is a brightness histogram showing pixels of the image processed using the image enhancement method of FIG. 3 according to the embodiment of the present invention.
Figure 7C:
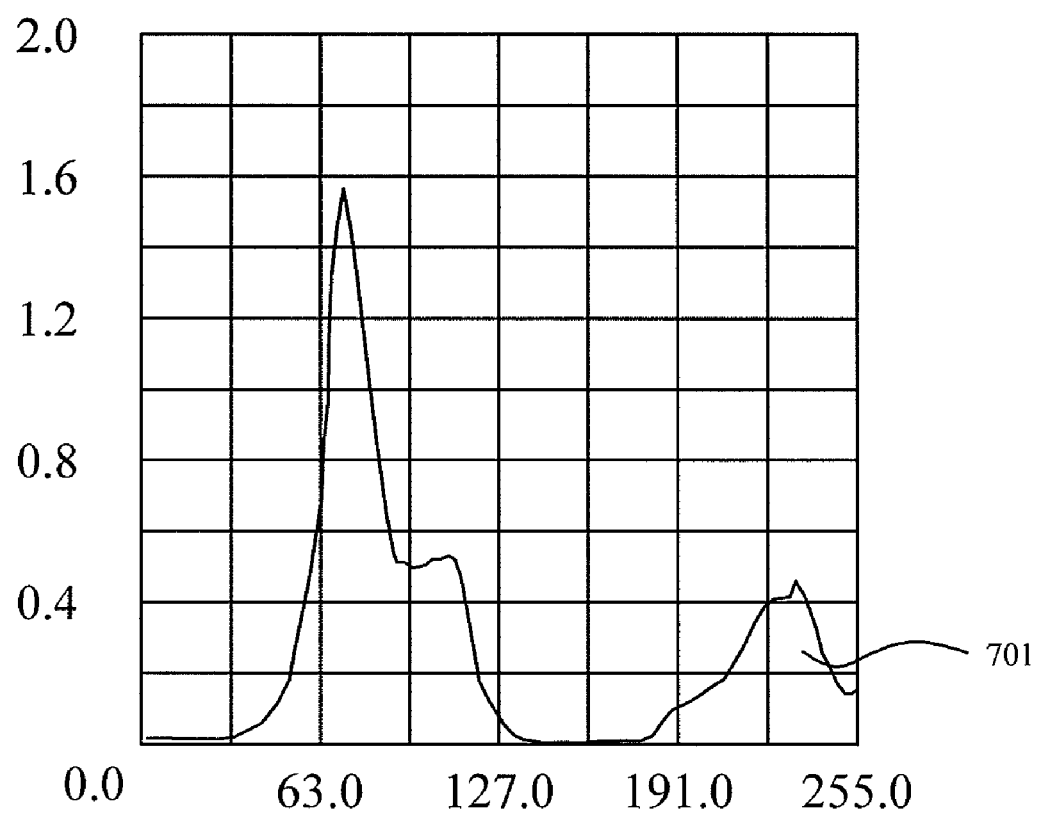
FIG. 7C is a brightness histogram showing blue pixels of the image processed using the image enhancement method of FIG. 3 according to the embodiment of the present invention.

In addition, FIG. 7B is a brightness histogram showing pixels of the image processed using the image enhancement method of FIG. 3 according to the embodiment of the present invention. FIG. 7C is a brightness histogram showing blue pixels of the image processed using the image enhancement method of FIG. 3 according to the embodiment of the present invention. As shown in FIGS. 7B and 7C, the brightness distributions of the pixels become more uniform in the image processed using the method according to the embodiment of the present invention. At last, compared FIG. 7C with FIG. 2B, it is obtained that the problem of brightness saturation is not caused by the image processing method of the present invention in the portion 701 with the higher brightness with respect to the blue pixels processed by the method according to the embodiment of the present invention. If the prior art method of FIG. 1 is utilized to process the image similar to FIG. 2B, the blue pixels may seriously saturated, and this condition causes the loss of the details of the image so that the image is seriously distorted. However, the embodiment of the present invention utilizes the local gain correction. That is, each pixel is corrected according to the pixels, which surround the pixel and are disposed within a region enclosing the pixel. Thus, the embodiment of the present invention can enhance the image contrast without distorting the details of the image and can reduce the calculation load to be smaller than that of the prior art.

In step S314, the method ends.

Figure 8:
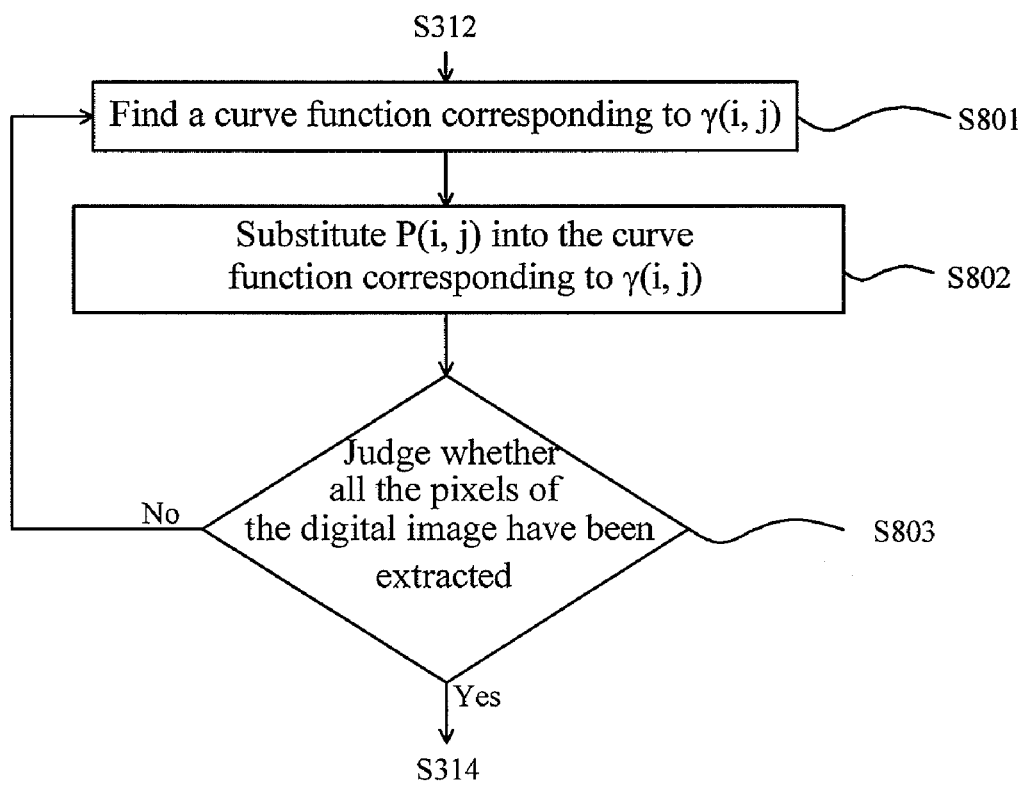
FIG. 8 is a detailed flow chart showing the step S313 in the image enhancement method according to the embodiment of the present invention.

The step S313 may be simply divided into several sub-steps. FIG. 8 is a detailed flow chart showing the step S313 in the image enhancement method according to the embodiment of the present invention. Referring to FIG. 8, the step S313 includes the following sub-steps.

In sub-step S801, a curve function corresponding to the (i, j)$^{th}$ curve index, hereinafter referred to as γ(i, j), is found from the curve index image.

In sub-step S802, the (i, j)$^{th}$ pixel P(i, j) of the digital image is substituted into the curve function corresponding to the (i, j)$^{th}$ curve index γ(i, j) of the curve index image to obtain the (i, j)$^{th}$ pixel of the corrected digital image.

In sub-step S803, it is judged whether all the pixels of the digital image have been extracted. If not, the procedure goes back to the sub-step S801 until all the pixels have been extracted so that the corrected digital image can be obtained.

In the above-mentioned embodiment, the image enhancement is performed by firstly constituting the curve index image and then performing the compensation. However, one of ordinary skill in the art may understand that the specific pixel P(i, j) may be substituted into the corresponding specific curve function after the specific curve function corresponding to the specific pixel P(i, j) is obtained in the step S308. Thus, the present invention is not limited to the step. In addition, one of ordinary skill in the art may understand that the spatial filter operation is not the essential step, and may be optional according to the requirement on the image quality of the product or the operation speed. So, the present invention is not limited thereto.

It is to be noted that the method for performing the image enhancement operation uses the pixel as the unit in the above-mentioned embodiment. However, one of ordinary skill in the art may understand that the image enhancement operation may be performed using the block as the unit according to the same rule. Thus, the present invention is not restricted to this possible aspect. Next, another embodiment, in which the image enhancement operation is performed using the block as the unit, will be illustrated so that one of ordinary skill in the art may implement the present invention according to the spirit of the present invention.

Figure 9:
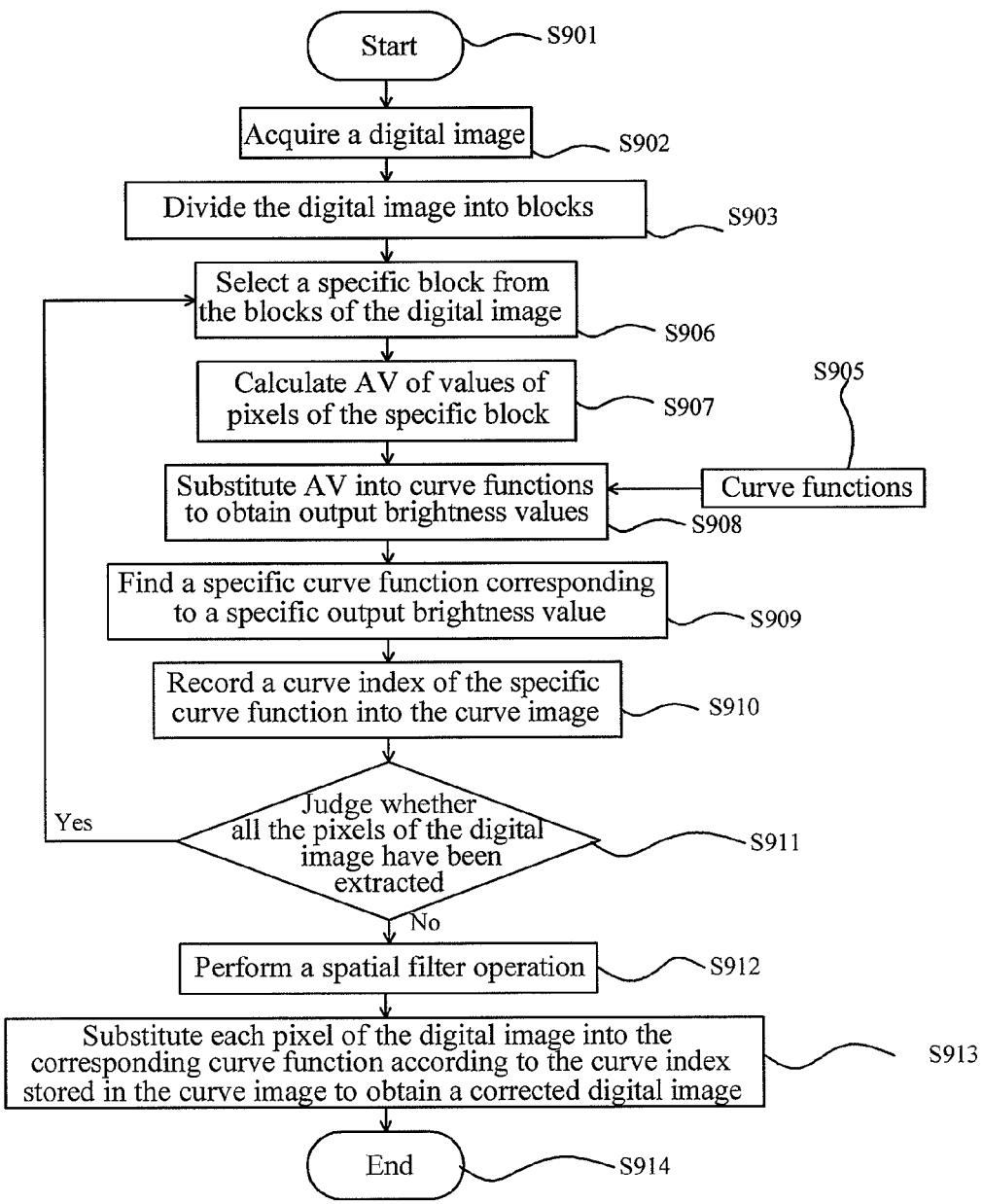
FIG. 9 is a flow chart showing the image enhancement method according to the embodiment of the present invention.

FIG. 9 is a flow chart showing the image enhancement method according to the embodiment of the present invention. Referring to FIG. 9, the method includes the following steps.

In step S901, the method starts.

In step S902, a digital image is acquired.

In step S903, the digital image is divided into a plurality of blocks.

In step S905, a plurality of curve functions is provided. Similarly, the curve functions shown in FIG. 4 are still provided in this embodiment. One of ordinary skill in the art may understand that the curve functions may also be those shown in FIG. 10. So, the present invention is not restricted to the curve functions of FIG. 4.

In step S906, a specific block is selected from the blocks of the digital image.

In step S907, an average AV of values of the pixels of the specific block is calculated. Similarly, the average is calculated by dividing the sum of the pixel values of the pixels by the number of pixels in this block. Herein, the pixel value is defined by the luminance (combination of R, G, and B pixels) of the pixel.

In step S908, the average of the specific block is substituted into the curve functions provided by the step S905 so that a plurality of output brightness values is obtained.

In step S909, a specific output brightness value closest to a specific brightness value is found from the output brightness values so that a specific curve function corresponding to the specific output brightness value can be found. Similarly, it is possible to set the brightness value, which may be comfortably felt by the human eyes, as the specific brightness value. Next, the brightness values obtained in the step S908 are respectively compared with the specific brightness value so that the output brightness value closest to the specific brightness value can be found. Then, the corresponding curve function can be found according to the output brightness value closest to the specific brightness value.

Figure 10:
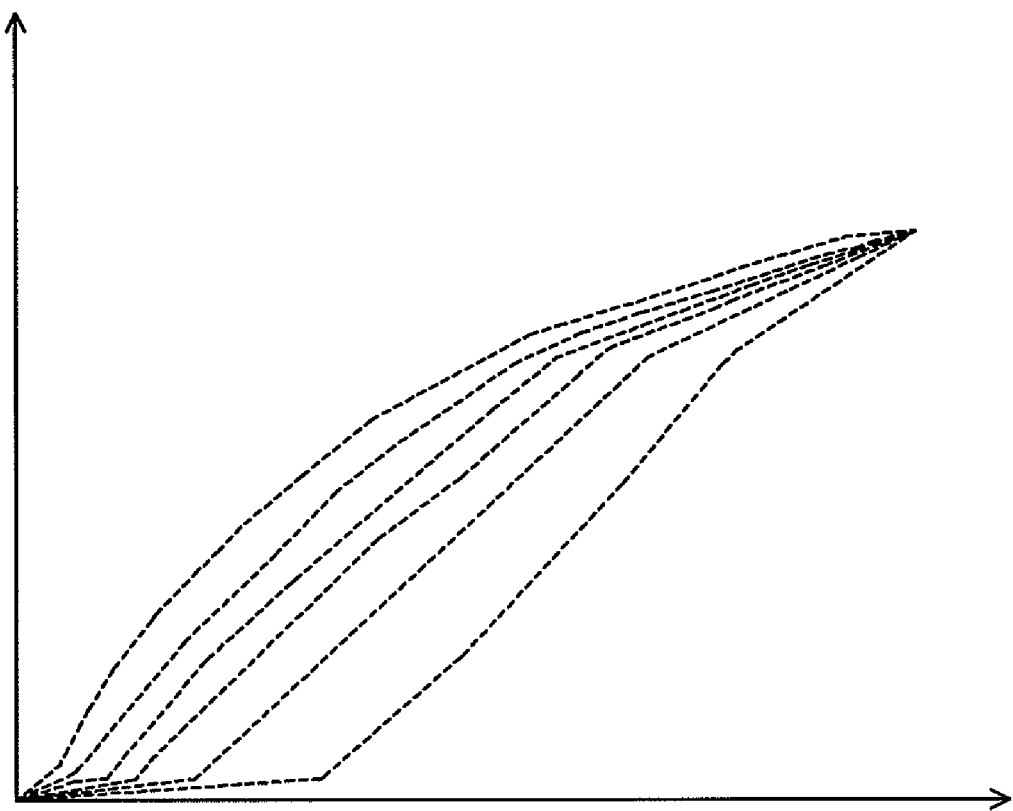
FIG. 10 is a schematic illustration showing the curve functions according to the embodiment of the present invention.

In step S910, the curve index of the specific curve function is recorded in the curve index image, wherein the curve index of the specific curve function is recorded at the corresponding position corresponding to the specific block. FIG. 10 is a schematic illustration showing the curve functions according to the embodiment of the present invention.

Figure 11:
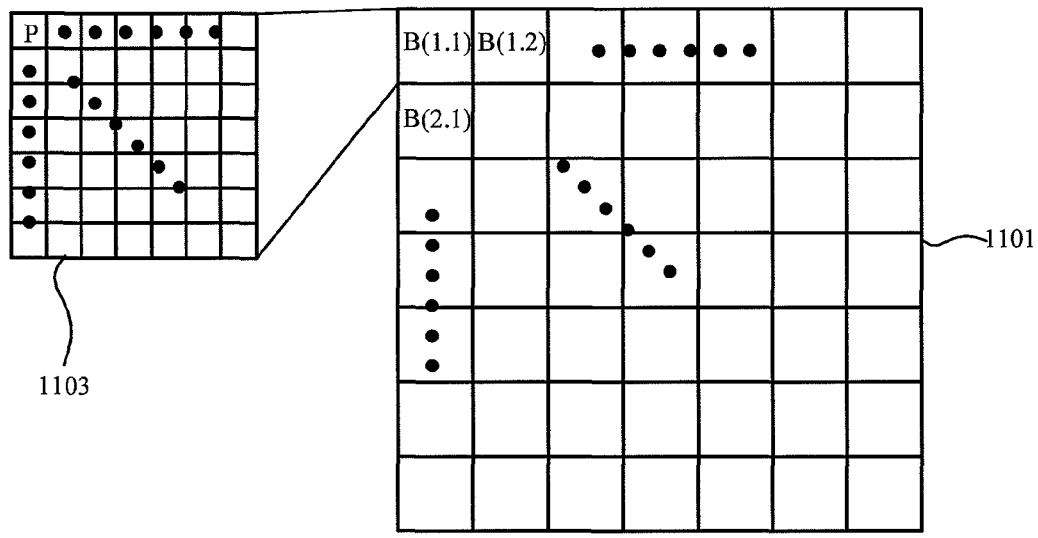
FIG. 11 is a schematic illustration showing the step S910 according to the embodiment of the present invention.
Figure 11:
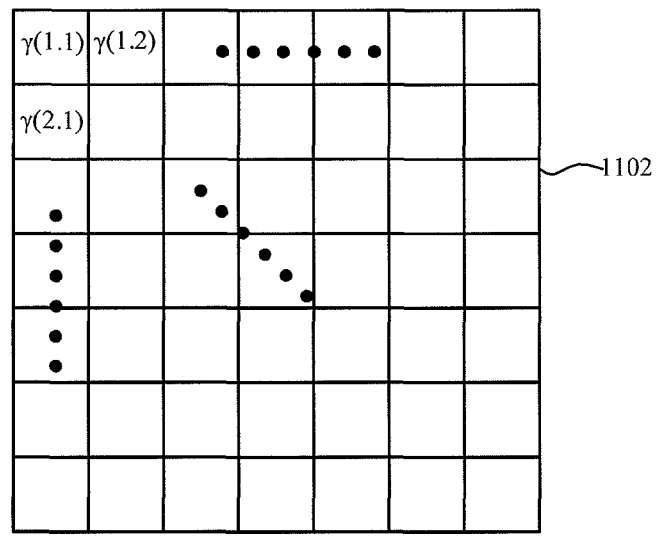

FIG. 11 is a schematic illustration showing the step S910 according to the embodiment of the present invention. As shown in FIG. 11 of this embodiment, symbol 1101 represents the digital image, symbol 1102 represents the curve index image, and symbol 1103 represents the block B(1,1) of the digital image including multiple pixels. Each pixel γ(i, j) of the curve index image stores the preferred curve index corresponding to the block B(i, j). In addition, each block includes multiple pixels P.

In step S911, it is judged whether there is a block that has not been extracted. If yes, the extracted block is eliminated, and the above-mentioned steps S906 to S910 are repeated until all the blocks have been extracted to fill the positions of the pixels of the curve index image. If all the pixels have been extracted, step S912 is performed.

In the step S912, a spatial filter operation is performed on the curve index image. Similarly, if the curve index image is directly used to compensate the digital image, the textures of the image may disappear. Thus, the spatial filter operation has to be performed on the curve index image. Generally speaking, the spatial operation is a low-pass operation. In the technological field of image processing, the spatial filter operation may be performed in many ways, and detailed description thereof will be omitted.

In step S913: each pixel of the digital image is substituted into the corresponding curve function according to the curve index stored in the curve index image to obtain a corrected digital image.

In step S914, the method ends.

The different between this embodiment and the embodiment of FIG. 3 is that this embodiment needs not to extend the extracted block into another larger block. In addition, because this embodiment uses the block as the unit, the curve index image is relatively smaller than the curve index image used in FIG. 3, and the operation speed is relatively higher that that of the method of FIG. 3.

Figure 12:
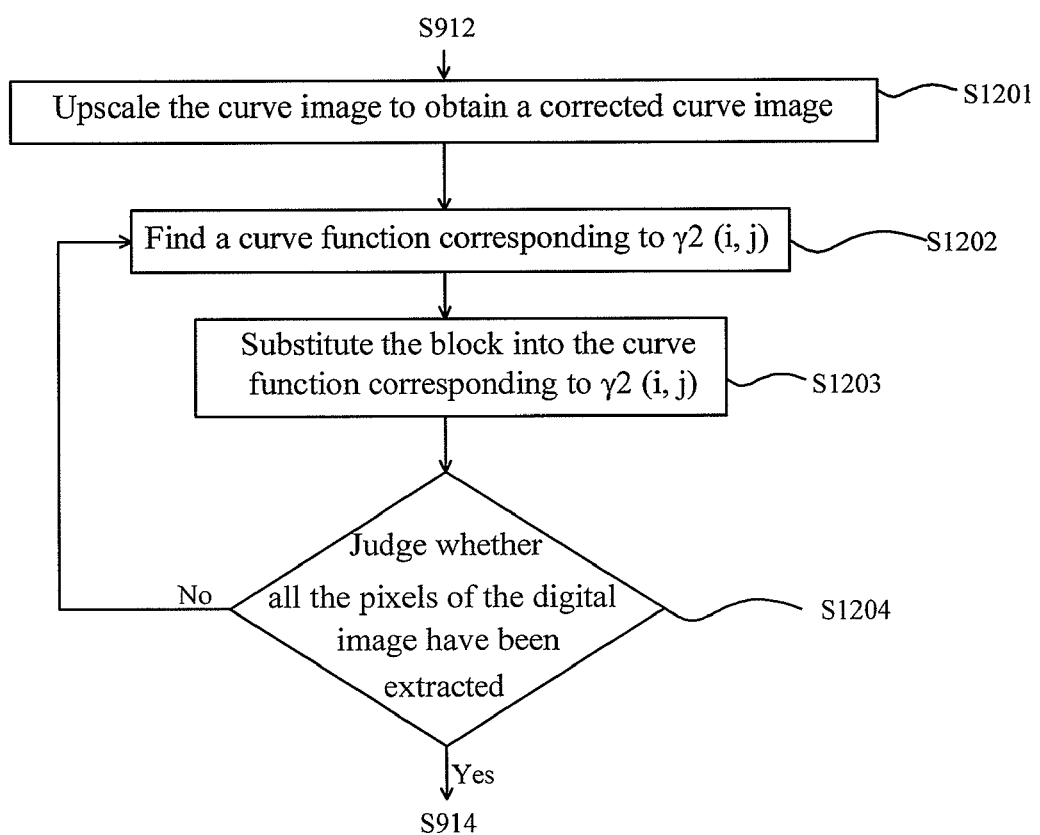
FIG. 12 is a detailed flow chart showing the step S913 in the image enhancement method according to the embodiment of the present invention.

Referring again to FIG. 11, the curve index image does not correspond to the pixels in a one-to-one manner, but does correspond to the block B(i, j) in the one-to-one manner. Thus, if all the pixels of the block B(i, j) are substituted into the (i, j)$^{th}$ curve index γ(i, j), the digital image may have the grid-like brightness distribution. Thus, the preferred implementation of the step S913 may be divided into several sub-steps. FIG. 12 is a detailed flow chart showing the step S913 in the image enhancement method according to the embodiment of the present invention. Referring to FIG. 12, the step S913 includes the following sub-steps.

In sub-step S1201, the curve index image is upscaled to obtain a corrected curve index image, wherein the number of pixels of the corrected curve index image is the same as the number of pixels of the digital image. Generally speaking, this upscaling method is to obtain the pixel, which is not originally obtained, by way of interpolation.

In sub-step S1202, the corresponding curve function is found from the $(i, j)^{th}$ curve index of the corrected curve index image, hereinafter referred to as $\gamma 2$ (i, j) ($\gamma 2$ is the upscaled curve index image).

In sub-step S1203, the $(i, j)^{th}$ pixel of the digital image is substituted into the curve function corresponding to the $(i, j)^{th}$ curve index $\gamma 2$ (i, j) of the corrected curve index image to obtain the $(i, j)^{th}$ block of the corrected digital image.

In sub-step S1204, it is judged whether all the pixels of the digital image have been extracted. If not, the procedure goes back to the sub-step S1202 until all the pixels have been extracted so that the corrected digital image can be obtained.

In the above-mentioned embodiments, the luminance (combination of R, G, and B pixels) of the pixels serves as the pixel value. However, one of ordinary skill in the art may understand that the determination of the pixel value is not limited thereto. Instead, the average of the pixel values of the red, green and blue sub-pixels or the maximum of the pixel values of the red, green and blue sub-pixels may serve as the pixel value, or the image may be directly divided into red, green and blue images, which are respectively processed using the above-mentioned steps of the methods. The methods mentioned hereinabove only pertain to the design choices to one of ordinary skill in the art, so detailed descriptions thereof will be omitted.

In summary, the spirit of the present invention is to find out the preferred curve function corresponding to the corrected unit in a manner of analyzing the brightness of the block brightness. Thus, even if the image has the extremely great brightness difference, the enhanced image still may be clear. In addition, the present invention has the following advantages. First, only the simple calculation is needed because the simple operations of addition, subtraction, multiplication and division are needed. Second, the smaller memory is needed because it is unnecessary to store reference images in advance.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. An image enhancement method, comprising the steps of:
   acquiring a digital image;
   selecting a specific pixel from a plurality of pixels of the digital image;
   selecting some of the pixels surrounding the specific pixel to constitute a specific block;
   calculating an average of values of the pixels of the specific block;
   providing a plurality of curve functions;
   substituting the average of the values of the pixels of the specific block into the curve functions to obtain a plurality of output brightness values; and
   finding one of the output brightness values, which is closest to a specific output brightness value of a specific brightness value, to find out a specific curve function corresponding to the specific output brightness value.

2. The method according to claim 1, wherein the step of providing the curve functions comprises:
   providing a plurality of curve look-up-tables to represent the curve functions.

3. The method according to claim 1, further comprising the step of:
   substituting a pixel value of the specific pixel into the specific curve function to obtain a corrected pixel value.

4. The method according to claim 1, further comprising the steps of:
   providing a curve index image, wherein positions of pixels of the curve index image are the same as positions of the pixels of the digital image; and
   recording a curve index of the specific curve function in the curve index image, wherein the curve index of the specific curve function is recorded at a corresponding position corresponding to the specific pixel.

5. The method according to claim 4, further comprising the step of:
   eliminating the specific pixel,
   wherein the above-mentioned steps are repeated until all of the pixels have been extracted to fill the positions of the pixels of the curve index image.

6. The method according to claim 5, further comprising the step of:
   performing a spatial filter operation on the curve index image.

7. The method according to claim 5, further comprising the step of:
   substituting each of the pixels of the digital image into a corresponding one of the curve functions according to the curve index stored in the curve index image to obtain a corrected digital image.

8. The method according to claim 7, wherein the digital image comprises M×N pixels, the curve index image comprises corresponding M×N pixels, and the step of substituting each of the pixels of the digital image into the corresponding one of the curve functions according to the curve index stored in the curve index image to obtain the corrected digital image comprises the sub-steps of:
   (a) finding the corresponding curve function from the $(i, j)^{th}$ curve index of the curve index image;
   (b) substituting the $(i, j)^{th}$ pixel of the digital image into the curve function corresponding to the $(i, j)^{th}$ curve index of the curve index image to obtain an $(i, j)^{th}$ pixel of the corrected digital image; and
   (c) eliminating the extracted pixel,
   wherein the sub-steps (a) to (c) are repeated until all the pixels have been extracted, wherein M, N, i and j are natural numbers, $0<=i<=M-1$, and $0<=j<=N-1$.

9. The method according to claim 8, wherein the sub-step (a) comprises:
   finding at least one first specific curve function and a second specific curve function, which are close to the $(i, j)^{th}$ curve index; and
   performing an interpolation operation on the first specific curve function and the second specific curve function to obtain the curve function corresponding to the $(i, j)^{th}$ curve index.

10. The method according to claim 1, further comprising the step of:

replacing the value of the pixel with a luminance of the pixel, wherein the luminance is the combination of red, green and blue sub-pixels.

11. An image enhancement method, comprising the steps of:

acquiring a digital image;

dividing the digital image into a plurality of blocks;

selecting a specific block from the blocks of the digital image;

calculating an average of values of pixels of the specific block;

providing a plurality of curve functions;

substituting the average of the values of the pixels of the specific block into the curve functions to obtain a plurality of output brightness values;

finding one of the output brightness values, which is closest to a specific output brightness value of a specific brightness value, to find out a specific curve function corresponding to the specific output brightness value.

12. The method according to claim 11, wherein the step of providing the curve functions comprises:

providing a plurality of curve look-up-tables to represent the curve functions.

13. The method according to claim 11, further comprising the step of:

upscaling the values of the pixels of the specific block to obtain different curve functions, and substituting the values of the pixels of the specific block into the specific curve function to obtain a plurality of corrected pixel values.

14. The method according to claim 11, further comprising the step of:

providing a curve index image, wherein positions of the pixels of the curve index image are the same as positions of the blocks of the digital image; and recording a curve index of the specific curve function in the curve index image, wherein the curve index of the specific curve function is recorded at a corresponding position corresponding to the average of the values of the pixels of the specific block.

15. The method according to claim 14, further comprising the step of:

eliminating the specific block, wherein the above-mentioned steps are repeated until all of the blocks have been extracted to fill the positions of the pixels of the curve index image.

16. The method according to claim 15, further comprising the step of:

performing a spatial filter operation on the curve index image.

17. The method according to claim 15, further comprising the step of:

substituting each of the pixels of the digital image into a corresponding one of the curve functions according to the curve index stored in the curve index image to obtain a corrected digital image.

18. The method according to claim 17, wherein the digital image comprises M×N blocks, the curve index image comprises corresponding M×N pixels, and the step of substituting each of the pixels of the digital image into the corresponding one of the curve functions according to the curve index stored in the curve index image to obtain the corrected digital image comprises the sub-steps of:

(a) upscaling the curve index image to obtain a corrected curve index image, wherein the number of pixels of the corrected curve index image is the same as the number of pixels of the digital image;

(b) finding a corresponding one of the curve functions from the $(i, j)^{th}$ curve index of the corrected curve index image;

(c) substituting the $(i, j)^{th}$ pixel of the digital image into the curve function corresponding to the $(i, j)^{th}$ curve index of the corrected curve index image to obtain an $(i, j)^{th}$ pixel of the corrected digital image; and (d) eliminating the extracted pixel, wherein the sub-steps (b) to (d) are repeated until all the pixels have been extracted, wherein M, N, i and j are natural numbers, $0<=i<=M-1$, and $0<=j<=N-1$.

19. The method according to claim 18, wherein the sub-step(b) comprises:

finding at least one first specific curve function and a second specific curve function, which are close to the $(i, j)^{th}$ curve index; and performing an interpolation operation on the first specific curve function and the second specific curve function to obtain the curve function corresponding to the $(i, j)^{th}$ curve index.

20. The method according to claim 11, further comprising the step of:

replacing the value of the pixel with a luminance of the pixel, wherein the luminance is the combination of red, green, and blue sub-pixels.

* * * * *